May 28, 1963 P. B. REASER 3,091,505
MEANS OF RECORDING AND/OR DISPLAYING PHYSICAL MAGNITUDES
Filed Aug. 29, 1960 2 Sheets-Sheet 2

INVENTOR.
PAUL REASER
BY Paul B Reaser

United States Patent Office 3,091,505
Patented May 28, 1963

3,091,505
MEANS OF RECORDING AND/OR DISPLAYING
PHYSICAL MAGNITUDES
Paul Bernard Reaser, New Orleans, La.
(19901 Nordhoff, Northridge, Calif.)
Filed Aug. 29, 1960, Ser. No. 52,513
3 Claims. (Cl. 346—29)

This invention relates to a system responsive to changes in variable conditions such as weight, tension and fluid pressure to effect a corresponding indication, recording or control action and more particularly to a novel system employing hydraulic linkage of magnetic components.

Apparatus of the type contemplated by this invention comprises a means for sensing and measuring changes in a variable condition such as, for example, balanced lever systems deflectable in response to changes in weight wherein a writing or indicating pointer is mechanically linked to said lever system, an electrical indicating instrument having a pointer and responsive to changes in electrical characteristics of such components as transducers, a hydraulic indicating instrument wherein a Bourdon tube or bellows activated pointer is responsive to hydraulic pressure changes within a closed system embodying a cylinder or diaphragm deflectable in response to changes in weight, and, various systems employing gases or vapors in a similar fashion.

An object of this invention is the provision of a hydromagnetic system responsive to changes in a variable condition and which system provides a measurement, record or control of a variable condition.

An object of this invention is the provision of a hydromagnetic system comprised of a spring-bellows assembly, hydraulically linked by means of tubing to a cylinder assembly incorporating an inner, freely movable magnetic piston and, an external circumferential magnetic member to which is attached a writing and/or indicating pointer and which is dependent upon the inner magnet for movement.

An object of this invention is the provision of a hydromagnetic system comprised of a spring-bellows assembly, connecting tubing and a cylinder assembly in which the spring-bellows assembly and necessary tubing is incorporated in a housing suitable for use as a supporting structure, and hence a load sensing device, for platforms, bins, hoppers and tanks, and, in which the cylinder assembly is housed in a suitable case with contained chart and drive mechanism either proximate to or remote from the load supporting assembly.

An object of the invention is the provision of a hydromagnetic system comprised of a spring-bellows assembly, connecting tubing and a cylinder assembly in which is incorporated a mechanically activated auxiliary bellows in such a fashion as to allow adjustment of the fluid volume so as to effect movement of the inner piston and associated members independently of the deflection of the spring-bellows assembly.

An object of this invention is the provision of a hydromagnetic system comprised of a spring-bellows assembly, connecting tubing and a cylinder assembly in which provision is made for the external magnetic member to attract and carry with it a steel ball in such a way that the ball is dropped into a slot at any point by merit of vanes that prevent their return when repetitive measurements are made, hence allowing the demonstration of frequency distribution patterns.

An object of this invention is the provision of a hydromagnetic system comprised of a spring-bellows assembly, connecting tubing and a cylinder assembly in which the additional facility is provided whereby the external magnet member is enabled to trip suitable microswitches at one or more points along the length of the cylinder.

An object of this invention is the provision of a hydromagnetic system comprised of a spring-bellows assembly, connecting tubing and a cylinder assembly in which the variable condition is the revolution of cams acting on a plurality of spring-bellows assemblies and in which the cylinder assembly is comprised of the inner piston magnet effecting a vertical movement of plastic balls containing steel balls by merit of magnetic flux exerted in such a way as to allow the demonstration of preselected dynamic patterns.

These and other objects or the advantages of the invention will become apparent from the following specifications when taken with the accompanying drawings. It will be understood, however, that the drawings are for purposes of illustration and are not to be construed as defining the scope or limits of the invention, reference being had for the latter purpose to the claims appended hereto.

In the drawings wherein like reference characters denote like parts in the several views.

Figure 1:
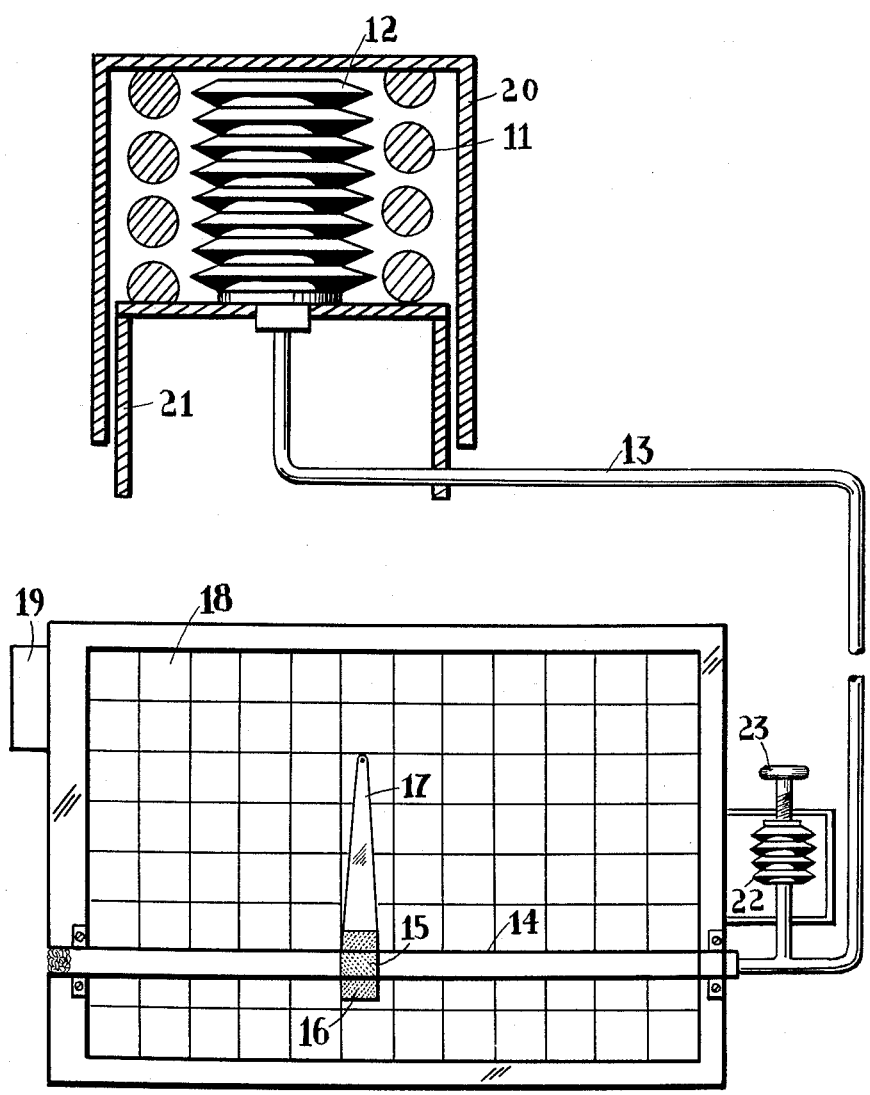
FIGURE 1 is a diagrammatic view of the hydraulic and magnetic components in an instrument embodying my invention.

In the instrument illustrated in FIGURE 1, which is a mechanism for sensing changes in a variable condition, there is shown a helical spring 11 and a metallic bellows 12. In the present embodiment, these members are mechanically linked in such a way that compression of the spring 11 results in an equal linear deflection of the bellows 12. There is a connecting tubing 13 that hydraulically links the fluid contents of the bellows to a thin-walled precision bore cylinder or tube 14, which contains a ceramic magnet piston 15 suitably coated to provide nearly friction free movement within the cylinder 14 in response to a volumetric change in the bellows 12 as transmitted thru the connecting tubing 13. External to the cylinder 14 is a carrier magnet 16 also suitably coated to provide nearly friction free movement responsive to the movement of the inner magnet piston 15. The thin wall of the cylinder 14 allows the utilization of sufficient magnetic flux to provide a firm linkage between these two members so that a writing pen 17 can be secured to the external carrier magnet 16. A suitable strip chart 18 and drive assembly 19 is provided. The magnitude of movement of the magnetic members is a function of the cubic volume displacement within the bellows 12. Wide ranges of amplification are possible and dependent upon the ratio between the cross-sectional areas of the bellows 12 and the cylinder 14.

The spring 11 varies in spring rate according to the needs of a particular embodiment from a few ounces to many tons. The design of the spring is such that temperature dependence, hysteresis and permanent set are not appreciable factors in ordinary weighing applications.

From the foregoing description, it will be seen that a consideration of accuracy is necessary in order to characterize the responsiveness of the system. By dead weight testing with water in a tank, supported by four such spring-bellows assemblies manifolded into a single cylinder assembly, it can be demonstrated that the sensitivity and the error, in terms of a Standard Deviation, are on the order of one tenth of 1% of the rated capacity. This has been ascertained with spring rates of 1000 pounds and 20,000 pounds.

When this invention is used as a load supporting device that is responsive to weight changes a protective casing 20 and a supporting member 21 of suitable material are employed.

Referring to FIGURE 1 there is shown an additional embodiment that allows zero adjustment, or in the instance of an application sensing a change in weight, a means of adjusting for tare weight. The auxiliary bellows 22 is mechanically linked to a screw and knob lever 23 that effects an extension or compression of the auxiliary bellows 22 resulting in a reduction or increase in the fluid contents of the primary system thus in turn effecting the movement of the piston 15 within the cylinder 14 independent of the deflection of the primary bellows 12.

Figure 2:
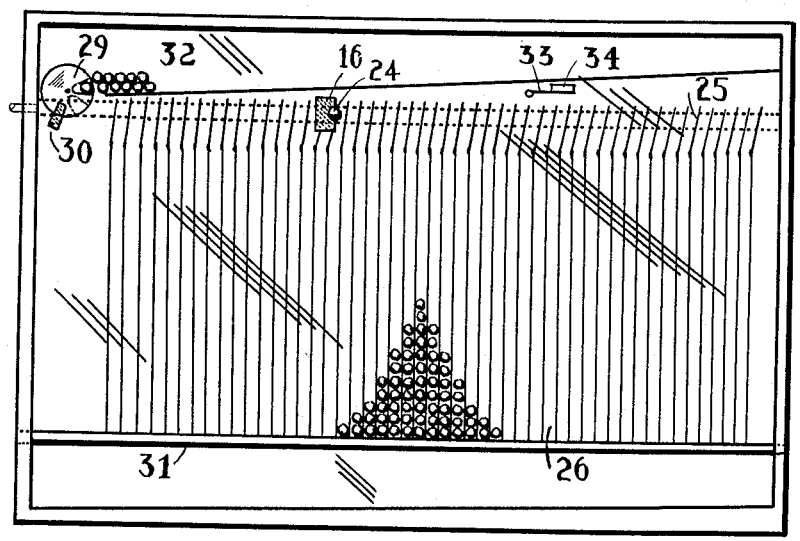
FIGURE 2 is a diagrammatic view showing another embodiment of this invention.

Referring to FIGURE 2, there is shown an additional embodiment that allows the demonstration of the frequency distribution pattern of repetitive responses to variable conditions of the same type such as weight. When a variable condition is being measured the progression of the carrier magnet 16 results in the movement of the ball 24 past the series of vanes 25 separating the individual slots 26. The flexibility and curvature of the vanes 25 prevent the return of the ball 24 so that when the measured condition is removed from the system and the carrier magnet returns to zero a ball 24 drops into the slot 26a at the point of furtherest progression. A sliding member 31 allows the recovery of the balls 24 at the end of a series of measurements.

The steel balls are made available to the magnetic influence of the carrier magnet 16 by means of a pivoted arrangement whereby the magnetic action of said carrier magnet 16 results in repulsion of a small magnet 30 causing a slight rotation of the plastic disc 29 to occur thus causing a steel ball to drop from the reservoir 32 into the magnetic field of the carrier magnet 16.

Referring also to FIGURE 2, there is shown an additional embodiment that allows various control functions to be effected. The small steel vane 33 seen at the right side of the diagram represents the lever arm extension of a small microswitch 34 which is opened or closed by the movement of the vane 33 as the carrier magnet 16 causes its deflection by magnetic attraction.

Figure 3:
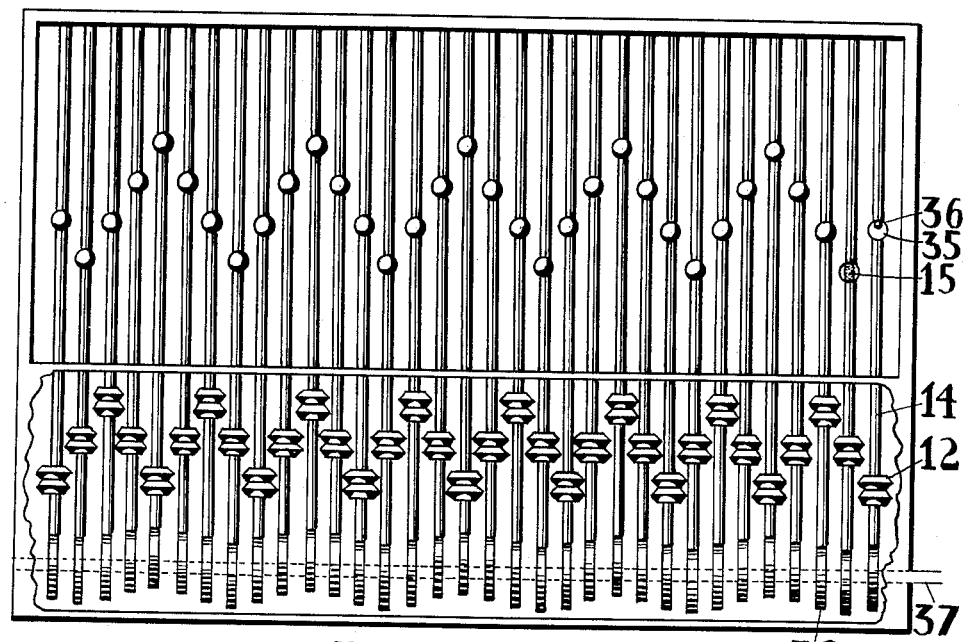
FIGURE 3 is a diagrammatic view of an arrangement suitable for demonstration of dynamic wave forms.

Referring to FIGURE 3, there is shown an additional embodiment that allows the demonstration of predetermined wave patterns of various types. A plurality of cylinders 14 containing piston magnets 15 and connected by means of tubing 13 with its contained fluid to the bellows assemblies 12 are arranged as closely together as is expedient. A horizontal shaft 37 on which are located removable cams 38 comprises a means of varying the deflection of the individual bellows 12 according to predetermined pattern dependent on cam 38 configuration. The shaft 37 rotation can be by manual or mechanical means not illustrated. Rotation of shaft 37 hence results in progression of piston magnet 15 and an externally placed plastic ball 35 containing a small steel ball 36 according to the configuration of cam 38.

Having now described this invention in detail in accordance with the requirements of the patent statutes various changes and modifications will suggest themselves to those skilled in the art, and it is intended that such changes and modifications shall fall within the scope and spirit of the invention, as recited in the following claims.

I claim:

1. A hydromagnetic recording system comprising in combination, a sensing member embodying a bellows, a precision spring, means associating said spring with said bellows for conjoint action therewith, said bellows and said spring being expandible in response to changes in a variable condition, a connecting tubing attached to one end of the bellows, a precision cylindrical tubular element, said tubing connecting said bellows and said tubular element, a magnetic piston in the form of a ceramic magnet in said element, said system being fluid filled, said piston being positionally responsive to said sensing member in accordance with the ratios of the diameters of the bellows and the magnetic piston, means supporting said tubular element, and an appreciable length thereof being free of attachment, a magnetic member external and closely adjacent to said tubular element and magnetically coupled to said piston for movement therewith, and a recording element coupled to said external magnetic member.

2. The invention as recited in claim 1 wherein the external magnetic member serves as a carrier for a small steel ball contained within a larger non ferrous ball, a plurality of such systems serving to demonstrate responses to multiple variable conditions in a pattern according to the pattern of the multiple variable conditions.

3. An instrument assembly for demonstrating frequency distribution patterns of repetitive events that can be manifested by pressure, vacuum, linear displacement or temperature by means of the expansion or contraction of a bellows containing a suitable liquid and connected by suitable tubing to a precision bore cylinder containing a close fitting magnet in such a fashion that the magnet is free to move horizontally in response to the contraction or expansion, thereby providing a piston, means whereby a small steel ball can be carried along a channel exterior to the cylinder by the magnetic attraction of the piston magnet comprised of a series of open slots vertically arranged and separated by thin vanes that allow the ball to be carried in one direction only when said balls are removed from the magnetic field when retro motion occurs at the end of the piston magnet excursion, said slots being in plurality and of sufficient length to allow the accumulation of a statistically significant number of balls, said balls being capable of being removed at the bottom for transfer to the reservoir where the balls originate, their removal from this reservoir being accomplished by the magnetic repulsion of the returning piston magnet against an escapement disc embodying a small magnet of similar polarity to said piston and having a pocket therein whereby a ball in a pocket of the escapement disc is caused to fall into the magnetic field of the piston magnet and be carried to the limit of the excursion and dropped into the appropriate slot, said slot being covered in front by a thin transparent cover in such a way that the array of small steel balls are readily visible depicting the frequency distribution pattern of the imparted repetitive events, said assembly being of proper size and location so as to contain the members listed in such a fashion that the sensing bellows can be compressed or expanded at any appropriate location where pressure manifestations can be imparted.

References Cited in the file of this patent

UNITED STATES PATENTS

| | | |
|---|---|---|
| 408,938 | Tata | Aug. 13, 1889 |
| 805,720 | Fulton | Nov. 28, 1905 |
| 1,075,620 | Arndt | Oct. 14, 1913 |
| 1,257,965 | Bailey | Mar. 5, 1918 |
| 1,286,537 | Cole | Dec. 3, 1918 |
| 1,534,306 | Bothezat et al. | Apr. 21, 1925 |
| 1,815,000 | Durant | July 14, 1931 |
| 1,962,324 | Noble | June 12, 1934 |
| 2,317,028 | Chappell et al. | Apr. 20, 1943 |
| 2,537,628 | Hanson et al. | Jan. 9, 1951 |
| 2,688,248 | Hart et al. | Sept. 7, 1954 |
| 2,709,430 | Traugott | May 31, 1955 |
| 2,921,595 | Erbguth | Jan. 19, 1960 |
| 2,948,151 | Astl | Aug. 9, 1960 |
| 2,968,182 | Young et al. | Jan. 17, 1961 |
| 2,977,177 | McLaughlin et al. | Mar. 28, 1961 |